Oct. 15, 1929.  F. THORNTON, JR  1,731,402
ELECTRIC TOASTER
Filed Jan. 19, 1928
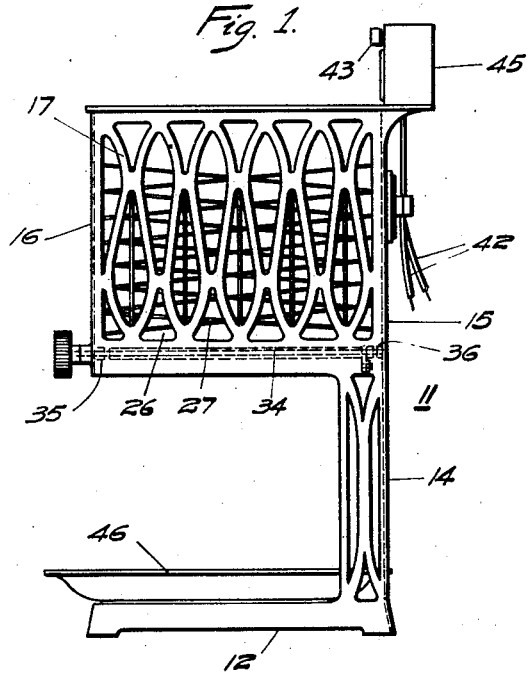
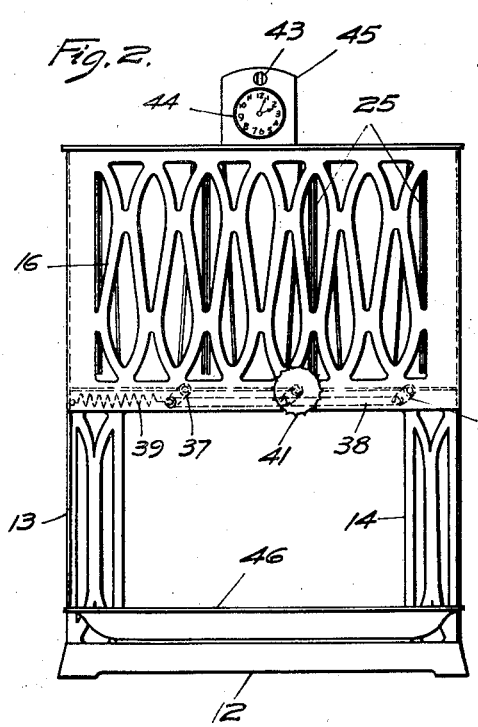
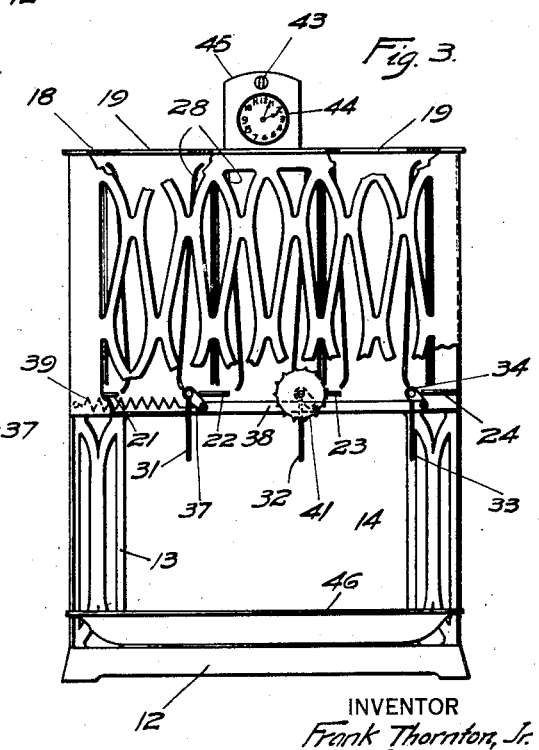
INVENTOR
Frank Thornton, Jr.
BY
Wesley S. Carr
ATTORNEY Patented Oct. 15, 1929

1,731,402

UNITED STATES PATENT OFFICE

FRANK THORNTON, JR., OF MANSFIELD, OHIO, ASSIGNOR TO WESTINGHOUSE ELECTRIC & MANUFACTURING COMPANY, A CORPORATION OF PENNSYLVANIA

ELECTRIC TOASTER

Application filed January 19, 1928. Serial No. 247,804.

My invention relates to electric cooking devices and particularly to electric toasters.

An object of my invention is to provide a relatively simple, compact and easily operated electric toaster.

Another object of my invention is to provide an electric toaster having a time-control element operatively associated therewith and embodying means for easily and quickly effecting the removal of slices of toast therefrom.

In practicing my invention, I provide a frame, a casing supported thereby and having a plurality of openings at its top and bottom, a plurality of spaced electric heating elements located within the casing, the energization of which is controlled by a clock mechanism and a switch operatively associated with the device.

Pivotally mounted bread-slice-supporting means are provided at the bottom of the casing to be yieldingly held in normal position to close the bottom openings of the casing and to support slices of toast during the toasting operation.

Crank arms are connected to the respective supporting means, the inner ends of which are connected to the respective supporting means, the outer ends of which are connected by a link member. A spring is connected to the casing and to one end of the link to yieldingly hold the supporting means in their normal operative positions, and a knob is connected to one of the supporting means to permit of turning the slice-supporting means to drop the toasted slices of bread out of the casing.

In the single sheet of drawings,

Figure 1 is a view, in side elevation, of a device embodying my invention.

Fig. 2 is a view, in front elevation, of a device embodying my invention, and

Fig. 3 is a view, in front elevation, illustrating a position of the bread-slice-supporting means which permits the toast to drop out of the casing, certain portions of the casing being broken away.

An electric toaster 11 comprises, in general, a base portion 12 and upright corner portions 13 and 14 which may be considered as constituting the frame of the toaster. At the upper end of the corner members 13 and 14 is located a casing embodying a rear wall 15, a front wall 16 and side walls 17, only one of which is shown in the drawings.

The casing comprises also a top plate or cover 18 having a plurality of spaced openings 19 therein. The bottom portion of the casing comprises a plurality of strips 21, 22, 23 and 24 of sheet metal and extends, in this particular embodiment of my invention, from front to back or between the members 15 and 16. The elements 21 to 24, inclusive, are spaced apart for a purpose to be hereinafter set forth in detail.

While I have shown a particular embodiment of front and side portions of the casing as being composed of sheet-metal elements having a plurality of openings therein to present a pleasing appearance, I do not desire to be limited thereto, as the front, rear and side walls of the casing may be made without any openings therethrough in order to provide a substantially closed casing. Any desired or suitable means for securing the front, rear, side, top and bottom walls of the casing together may be employed and I have, therefore, not shown any specific means for this purpose.

A plurality of spaced electric heating elements, designated by the numeral 25, are located within the casing and extend vertically from the front to the rear of the casing. The heating elements may be of any suitable type and I have, therefore, indicated them schematically only as embodying sheets 26 of electric insulating material, such as mica, and a resistor wire 27 wound thereon, in a manner well known in the art. Grid members 28, composed of wires which may be resiliently mounted at their upper ends, prevent engagement of slices of bread with the resistor member 27 during the toasting operation.

The openings in the bottom of the casing between the strips 21 to 24, inclusive, are normally closed by strips 31, 32 and 33 of sheet metal, one edge of each of which is secured to a pivotally mounted rod 34 extending between the front and rear walls of the casing and suitably mounted in bearing members 35 and 36, shown more particularly in Fig. 1 of the drawings.

Adjacent to, and in front of, the rear wall of the casing, the strips 31, 32 and 33 have crank arms or levers 37 connected thereto, to the outer ends of which is pivotally connected a link 38. One end of the link 38 has one end of a spring 39 connected thereto, the other end of which is connected to the inside of the casing, either to the left-hand end of the front wall 16 or to the left-hand wall 17. An actuating knob 41 is mounted on, and secured to, one of the rods 34.

The assembly of the slice-supporting means, rods, crank arms, link and spring is such that the normal operative position of the parts is as shown in Fig. 2 of the drawing, that is, the slice-supporting means 31, 32 and 33 close the openings in the bottom of the casing and are effective to support slices of bread which may be inserted through the openings 19 in the top of the casing.

A plurality of conductors 42 may be provided at the back of the casing which may be connected to a suitable source of supply. The other ends of the conductors 42 extend to a switch 43 which is combined with a clock-control mechanism 44, these two elements being preferably combined and located in a single casing 45. The switch mechanism 43 is indicated, generally only, by an actuating knob, and it is to be understood that any switch mechanism and time control mechanism, operative for the intended purpose, may be employed.

A plate 46 is located on the base 12 to receive the toasted slices of bread as they are permitted to fall from the case.

The operation of the device embodying my invention is substantially as follows: The clock mechanism 44 is adjusted to effect deenergization of the heating elements 25 after a predetermined length of time, say from two to three minutes, depending upon the dryness of the bread and the degree of toasting desired by the operator. The switch 43 may be closed manually and may effect starting of the clock mechanism. In any case, the mechanism is effective to permit energization of the heating elements for a predetermined length of time. Four heating elements are shown to permit of simultaneously toasting three slices of bread which are inserted through the top openings 19 to rest upon the supports 31, 32 and 33 which are, at this time, in the positions shown in Fig. 2 of the drawings. The clock mechanism will cause de-energization of the heating elements after the predetermined length of time. If the operator is waiting for the toasted slices of bread, he grasps the knob 41 and turns it in a counter-clockwise direction so that the supports and the associated elements will occupy the positions shown in Fig. 3 of the drawings, whereby the toasted slices of bread are permitted to fall on the plate 46. If, however, the operator does not desire to remove the toasted slices immediately, they may remain within the casing until needed and they will be prevented, to some degree, from cooling by the fact that they are located within the casing which, as hereinbefore stated, may be made solid instead of open, as is shown in the drawings, for this particular purpose.

Since various modifications may be made in the device embodying my invention without departing from the spirit and scope thereof, I desire that only such limitations shall be placed thereon as are imposed by the prior art or are set forth in the appended claim.

I claim as my invention:

A toaster comprising a casing having a plurality of spaced openings in the top and in the bottom thereof, a plurality of spaced electric heating elements located in the casing, a plurality of rods pivotally mounted at the bottom of the casing, sheet-metal strips secured to the respective rods, levers connected to the respective rods, a link connecting the outer ends of all of the levers, a spring operatively connected to the casing and to one end of the link for yieldingly holding the strips in their normal positions to close the lower openings and knob operatively secured to one of the rods for turning all of the rods simultaneously to turn the strips to their open positions.

In testimony whereof, I have hereunto subscribed my name this 12 day of January, 1928.

FRANK THORNTON, Jr.